(12) United States Patent
Lv et al.

(10) Patent No.: US 10,550,507 B2
(45) Date of Patent: Feb. 4, 2020

(54) WASHING MACHINE DRAINAGE STRUCTURE

(71) Applicant: QINGDAO HAIER WASHING MACHINE CO., LTD., Qingdao, Shandong (CN)

(72) Inventors: Peishi Lv, Shandong (CN); Lin Yang, Shandong (CN); Gangjin Zhang, Shandong (CN); Yun Tian, Shandong (CN)

(73) Assignee: QINGDAO HAIER WASHING MACHINE CO., LTD., Qingdao, Shandong (CN)

( * ) Notice: Subject to any disclaimer, the term of this patent is extended or adjusted under 35 U.S.C. 154(b) by 133 days.

(21) Appl. No.: 15/550,589

(22) PCT Filed: Nov. 23, 2015

(86) PCT No.: PCT/CN2015/095293
§ 371 (c)(1),
(2) Date: Aug. 11, 2017

(87) PCT Pub. No.: WO2016/127686
PCT Pub. Date: Aug. 18, 2016

(65) Prior Publication Data
US 2018/0030641 A1     Feb. 1, 2018

(30) Foreign Application Priority Data
Feb. 13, 2015  (CN) ............... 2015 1 0079419

(51) Int. Cl.
*D06F 39/08* (2006.01)
*F16K 15/04* (2006.01)
*F16K 31/44* (2006.01)

(52) U.S. Cl.
CPC .............. *D06F 39/08* (2013.01); *F16K 15/04* (2013.01); *F16K 31/44* (2013.01)

(58) Field of Classification Search
CPC .......... D06F 21/06; D06F 21/08; D06F 21/10; D06F 23/04; D06F 23/06; D06F 23/065; D06F 37/12; D06F 39/08; D06F 39/083
See application file for complete search history.

(56) References Cited

U.S. PATENT DOCUMENTS 2,016,635 A  * 10/1935 Henn ...................... E03D 1/266
                                                          4/393
5,152,159 A     10/1992 Kabeya et al.

FOREIGN PATENT DOCUMENTS

CN    2595841 Y    12/2003
CN    2614216 Y    5/2004

(Continued)

OTHER PUBLICATIONS

International Search Report (PCT/ISA/210) dated Mar. 2, 2016, by the State Intellectual Property Office of the P.R. China as the International Searching Authority for International Application No. PCT/CN2015/095293.

(Continued)

*Primary Examiner* — David G Cormier
(74) *Attorney, Agent, or Firm* — Buchanan Ingersoll & Rooney PC (57) ABSTRACT

A washing machine drainage structure for a washing machine, in which there is not water between an inner tub and an outer tub in washing and rinsing processes, includes comprises a ball valve and a driving device for controlling opening and closing of the ball valve, a drainage outlet is arranged at a bottom wall of an inner tub, a water inlet end of the ball valve is communicated with the drainage outlet, and the ball valve is driven by the driving device to be closed in the washing and rinsing processes and opened in draining (Continued)

and dehydrating processes. According to the drainage structure, the ball valve is driven by the driving device to be closed or opened so as to close or open the drainage outlet, thereby implementing drainage; and the drainage structure has a simple structure and is convenient to be mounted.

9 Claims, 5 Drawing Sheets

(56) References Cited

FOREIGN PATENT DOCUMENTS

| | | | |
|---|---|---|---|
| GB | 2 242 444 | A | 10/1991 |
| JP | 03-284294 | A | 12/1991 |
| JP | 09-28985 | A | 2/1997 |
| JP | 2015-029546 | A | 2/2015 |

OTHER PUBLICATIONS

Written Opinion (PCT/ISA/237) dated Mar. 2, 2016, by the State Intellectual Property Office of the P.R. China as the International Searching Authority for International Application No. PCT/CN2015/095293.

\* cited by examiner

WASHING MACHINE DRAINAGE STRUCTURE

TECHNICAL FIELD

The present invention relates to the technical field of washing machines, and particularly relates to a washing machine drainage structure.

BACKGROUND

With the improvement of the living standards, people have higher and higher demands on washing machines. A washing machine with a simple clothes washing function cannot meet the demands of people. Particularly, energy and development have become a theme of social development, so people do not only have a basic clothes washing demand on the washing machine, but also take energy saving as an important factor to measure the washing machine. An ordinary pulsator washing machine has a large amount of water between an inner tub and an outer tub in a water supplying process, so that the water outside the inner tub is wasted in a washing process. Currently, a water-saving type washing machine is developed, the lower part of a tub wall of the inner tub of such washing machine is not provided with dehydration and drainage holes, so that water only exists in the inner tub, but does not exist between the inner tub and the outer tub in the water supplying process; therefore, water in such washing machine can be fully utilized, and the amount of water in the water supplying process of such washing machine is 40% less than other washing machines ess, and meanwhile, the amount of a detergent used in such washing machine can also be reduced; furthermore, the amount of the water supplied into the inner tub is reduced, so that the load of the washing machine is reduced to a certain extent, and more electricity is saved.

However, the above water-saving type washing machine also has a defect that as the inner tub is not provided with dehydration and drainage holes, water cannot be drained in time in a dehydrating process, and the dehydrating process starts slowly with great vibrations and takes a relatively long time for dehydration, so that the energy efficiency is low and the dehydrated clothes have a relatively high water content.

Therefore, how to better solve the drainage problem of such washing machine is important to improve experience of users.

SUMMARY

To solve the problems described above, the present invention provides a washing machine drainage structure. Specifically, a technical solution adopted by the present invention is as follows.

A washing machine drainage structure for a washing machine which has no water between an inner tub and an outer tub in washing and rinsing processes, the washing machine comprises an inner tub without holes in the lower part of a tub side wall, a drainage outlet is arranged at a bottom wall of the inner tub, a water inlet end of a ball valve is communicated with the drainage outlet, and the ball valve is driven by the driving device to be closed in the washing and rinsing processes and opened in a draining procedure.

Further, the ball valve comprises a first valve rod and a second valve rod, the driving device drives the first valve rod to rotate for 90 degrees to open the ball valve, and the driving device drives the second valve rod to reversely rotate for 90 degrees to close the ball valve.

Further, the ball valve comprises a valve casing and a ball body, the ball body is rotatably arranged in the valve casing, and the first valve rod and the second valve rod are connected respectively with the ball body of the ball valve through a hinge.

Further, the washing machine comprises an outer tub coaxially mounted outside the inner tub;

the driving device comprises a first stop lever assembly and a second stop lever assembly, both of which are mounted on a bottom wall of the outer tub; and the first valve rod is stopped by the first stop lever assembly and rotates for 90 degrees in a reverse direction so as to open the ball valve when the inner tub rotates in a forward direction, and the second valve rod is stopped by the second stop lever assembly and rotates for 90 degrees in the forward direction so as to close the ball valve when the inner tub rotates in the reverse direction.

Further, the lengths of the first valve rod and the second valve rod meet: the first valve rod rotates for 90 degrees in the reverse direction as being stopped by the first stop lever assembly and then is separated from the first stop lever assembly, and the second valve rod rotates for 90 degrees in the forward direction as being stopped by the second stop lever assembly and then is separated from the second stop lever assembly.

Further, each of the first stop lever assembly and the second stop lever assembly respectively comprises a stop lever capable of moving upwards and downwards;

the first stop lever assembly is arranged at the outer side of the second stop lever assembly, and the length of the first valve rod is larger than the length of the second valve rod, so that the stop lever of the first stop lever assembly only stops the first valve rod when moving upwards; and the length of the stop lever of the second stop lever assembly is smaller than the length of the stop lever of the first stop lever assembly, and a distance between the second valve rod and the bottom wall of the outer tub is smaller than a distance between the first valve rod and the bottom wall of the outer tub, so that the stop lever of the second stop lever assembly only stops the second valve rod when moving upwards.

Further, each of the first stop lever assembly and the second stop lever assembly comprises the stop lever, a nut, a sealing sleeve, a fixing disk and a compression spring, the stop levers pass through the bottom wall of the outer tub, the upper part of each stop lever is located between the inner tub and the outer tub, the lower part of each stop lever is located at the exterior of the bottom wall of the outer tub, each sealing sleeve is set on the upper part of the stop lever and extends and contracts along with the movement of the stop lever, one end of each sealing sleeve is fixed on the stop lever through the nut, and the other end of each sealing sleeve is fixed on the bottom wall of the outer tub through the fixing disk in a sealed manner; and each spring is set over the lower part of the stop lever.

Further, a stop nut for stopping one end of each compression spring is arranged at the lower end of the stop lever, and each compression spring is arranged between the bottom wall of the outer tub and the stop nut.

Further, the bottom wall of the outer tub is provided with a groove structure, the first stop lever assembly and the second stop lever assembly are mounted in the groove structure, and the groove structure is provided with an outer tub drainage outlet.

Further, the driving device further comprises a press plate, a support, a pull rod and a traction motor, the support is fixed on the outer side of the bottom wall of the outer tub, the pull rod is rotatably mounted on the support, one end of the pull rod is connected with the traction motor, the other end of the pull rod is fixedly connected with the press plate, and two ends of the press plate press on the first stop lever assembly and the second stop lever assembly, respectively; and the pull rod and the press plate rotate around the support under the traction of the traction motor, when one end of the press plate moves upwards, the press plate presses the first stop lever assembly to move upwards, and the other end of the press plate moves downwards and then the second stop lever assembly moves downwards.

According to the present invention, only the upper part of the side wall of the inner tub is provided with a circle of dehydration and drainage holes, the dehydration and drainage holes are arranged at positions above the maximum water level of the inner tub of the washing machine and are used for draining dehydrated water in a dehydrating process, and other parts of the side wall of the inner tub are designed to be closed and are not provided with any through hole structure. Meanwhile, the drainage outlet with a relatively large aperture is arranged at the bottom wall of the inner tub, the drainage outlet is closed in the washing and rinsing processes and is opened in the draining process, and other parts of the bottom wall of the inner tub are designed to be closed.

The drainage structure provided by the present invention is applicable to the washing machine with the inner tub, the bottom wall of the inner tub is provided with the drainage outlet, and the ball valve of the drainage structure is driven by the driving device to be closed in the washing and rinsing processes and opened in the draining process. Therefore, according to the drainage structure provided by the present invention, the ball valve is driven by the driving device to be closed or opened so as to close or open the drainage outlet, thereby implementing drainage of the washing machine without holes in the lower part of the side wall of the inner tub; and the drainage structure provided by the present invention has a simple structure, is convenient to be mounted and is very valuable for market popularization.

REFERENCE SIGNS

1—inner tub; 13—outer tub; 14—outer tub drainage outlet; 15—groove structure; 16—first stop lever assembly; 17—second stop lever assembly; 18—pull rope; 19—traction motor; 20—press plate; 21—support; 22—pull rod; 23—stop lever; 24—nut; 25—sealing sleeve; 26—fixing disk; 27—compression spring; 28—fixed base; 29—stop nut; 30—first valve rod; 31—second valve rod; 32—hinge; and 33—ball valve.

DETAILED DESCRIPTION

A washing machine drainage structure of the present invention is described in detail below in conjunction with the accompanying drawings.

Figure 1:
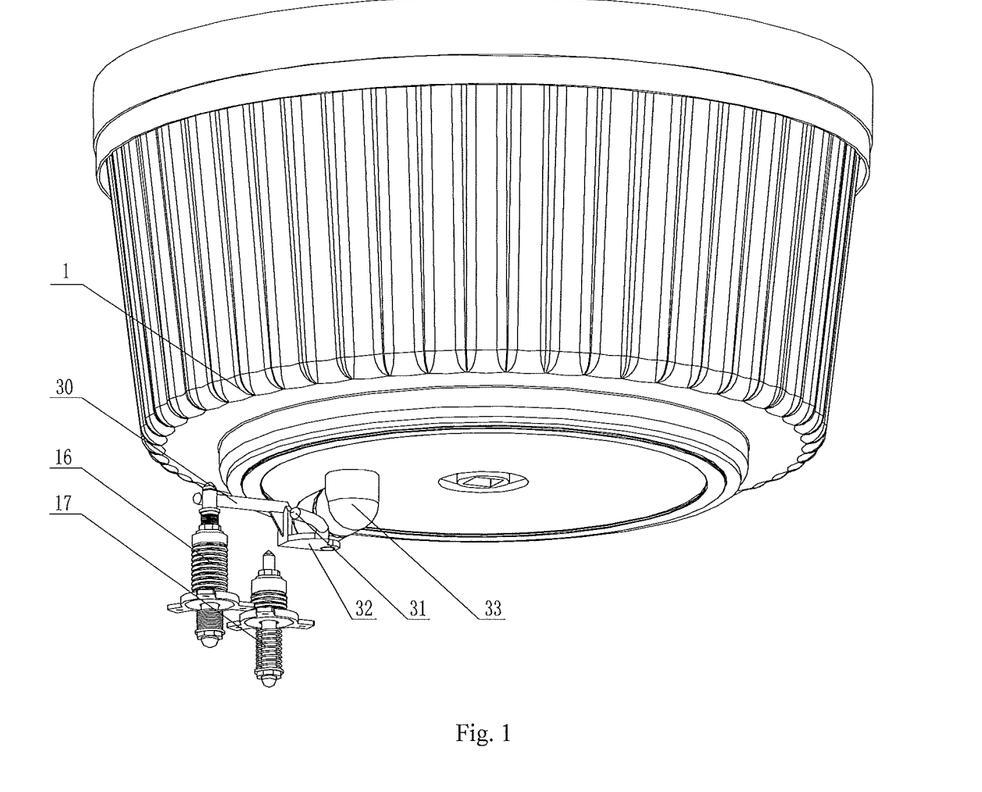
FIG. 1 is a stereoscopic view of a drainage structure mounted at the bottom of an inner tub of the present invention.
Figure 2:
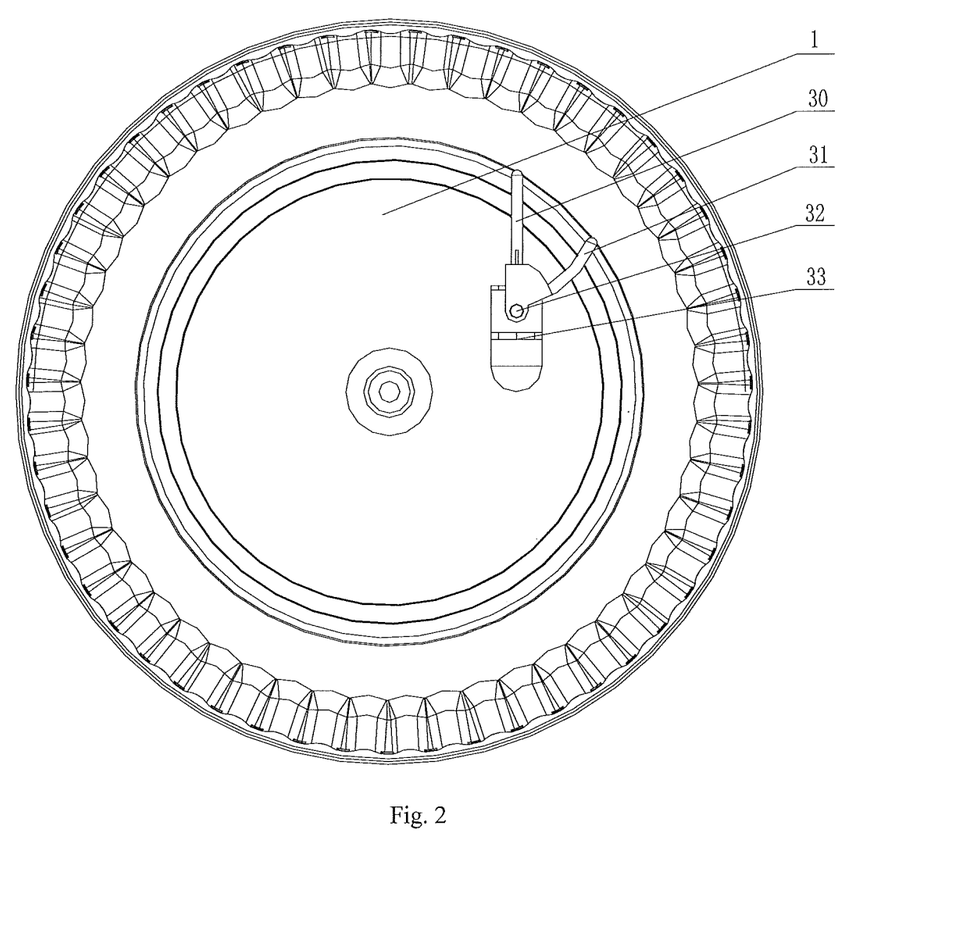
FIG. 2 is a bottom view of a drainage structure mounted at the bottom of an inner tub of the present invention.

As shown in FIG. 1 and FIG. 2, a washing machine drainage structure for a washing machine in which there is not water between an inner tub and an outer tub in washing and rinsing processes, is provided. The washing machine comprises an inner tub 1 without holes in the lower part of a tub side wall. The drainage structure comprises a ball valve 33 and a driving device. A drainage outlet is arranged at a bottom wall of the inner tub 1, a water inlet end of the ball valve 33 is communicated with the drainage outlet. The ball valve 33 is driven by the driving device to be closed in the washing and rinsing processes and opened in a draining procedure.

In the present invention, only the upper part of a side wall of the inner tub 1 is provided with dehydration and drainage holes in a circle. The dehydration and drainage holes are arranged at positions above the maximum water level of the inner tub of the washing machine and are used for draining dehydrated water in a dehydrating process, and other parts of the side wall of the inner tub 1 are designed to be closed and are not provided with any through hole structure. Meanwhile, the drainage outlet with a larger aperture is arranged at the bottom wall of the inner tub 1. The drainage outlet is closed in the washing and rinsing processes and is opened in the draining process, and other parts of the bottom wall of the inner tub 1 are designed to be closed.

The ball valve is a valve in which a ball body with a circular channel serves as an open-close component and which is opened and closed as the ball body rotates along with valve rods. The open-close component of the ball valve is a ball body with a hole and rotates around an axial line vertical to the channel so as to achieve the purpose of opening and closing the channel. The ball valve is mainly used for opening and closing a pipeline and a device medium. Therefore, in the washing machine drainage structure provided by the present invention, the ball valve 33 is mounted on the drainage outlet and is opened and closed by the driving device driving the valve rods of the ball valve 33 according to the working principles of the ball valve.

The washing machine drainage structure of the present invention adopting the ball valve mainly has the following advantages:

1. the opening and closing operations can be frequently performed, and it is fast and light to open and close;
2. The fluid resistance during draining is small;
3. The ball valve has simple structure, relatively small volume, light weight, and is easy to maintain;
4. The sealing property is good;
5. The mounting direction of the ball valve is not is not limited, and the medium can flow in any directions; and
6. No vibration is caused, and noise is low.

The drainage structure provided by the present invention is applicable to the washing machine in which there is not water between an inner tub and an outer tub in washing and rinsing processes. The drainage outlet is arranged at the bottom wall of the inner tub 1, and the ball valve 33 of the drainage structure is driven by the driving device to be closed in the washing and rinsing processes and opened in the draining process. Therefore, according to the drainage structure provided by the present invention, the ball valve is driven by the driving device to be closed or opened so as to close or open the drainage outlet, thereby implementing drainage. And the washing machine drainage structure provided by the present invention has a simple structure, is convenient to be mounted and is very valuable for market popularization.

As a preferred embodiment of the present invention, the ball valve 33 comprises a first valve rod 30 and a second valve rod 31. The driving device drives the first valve rod 30 to rotate for 90 degrees to open the ball valve 33, and the driving device drives the second valve rod 31 to reversely rotate for 90 degrees to close the ball valve 33.

In the present invention, the ball valve 33 comprises two valve rods for controlling the opening and closing of the ball valve 33 respectively, so that the ball valve 33 can be opened and closed by just controlling the driving device to control the first valve rod 30 and the second valve rod 31 to rotate.

Specifically, the ball valve 33 comprises a valve casing and a ball body, the ball body is rotatably arranged in the valve casing, and the first valve rod 30 and the second valve rod 31 are connected respectively with the ball body of the ball valve 33 through a hinge 32.

It is a key point of the present invention how to realize the rotation of the first valve rod 30 and the second valve rod 31 of the present invention and then to open and close the ball valve 33. Therefore, the present invention adopts the following technical solution to drive the first valve rod 30 and the second valve rod 31 to rotate.

As shown in FIG. 1, FIG. 3, FIG. 4 and FIG. 5, the washing machine comprises an outer tub 13 coaxially mounted outside the inner tub 1.

In the present invention, the driving device comprises a first stop lever assembly 16 and a second stop lever assembly 17, both of which are mounted on the bottom wall of the outer tub 13.

The first valve rod 30 is stopped by the first stop lever assembly 16 and rotates for 90 degrees in a reverse direction so as to open the ball valve 33 when the inner tub 1 rotates in a forward direction, and the second valve rod 31 is stopped by the second stop lever assembly 17 and rotates for 90 degrees in the forward direction so as to close the ball valve 33 when the inner tub 1 rotates in the reverse direction.

In the present invention, the rotation in the forward direction or the reverse direction does not limit rotation of the inner tub 1 in a constant direction, but only limits rotation of the inner tub 1 in two directions in the draining process. For example, when a clockwise direction is the forward direction, an anticlockwise direction is the reverse direction, vice versa. In the accompanying drawings of the present invention, the inner tub 1 rotates in the clockwise direction as the forward direction, and the inner tub 1 rotates in the anticlockwise direction as the reverse direction. In the present invention. The inner tub 1 rotates in two directions in order to open the ball valve 33 before draining and to close the ball valve 33 after the draining is completed.

As a preferred embodiment of the present invention, each of the first stop lever assembly 16 and the second stop lever assembly 17 comprises a stop lever 23 capable of moving upwards and downwards. The stop levers 23 of the first stop lever assembly 16 and the second stop lever assembly 17 need to respectively act on the first valve rod 30 and the second valve rod 31. The ball valve 33 cannot be opened and closed if action objects are wrong.

Therefore, the first stop lever assembly 16 is arranged outside the second stop lever assembly 17. The length of the first valve rod 30 is larger than the length of the second valve rod 31, so that the stop lever 23 of the first stop lever assembly 16 only stops the first valve rod 30 when moving upwards.

In this way, the first stop lever assembly 16 is arranged on the outer side of a free end of the second valve rod 31. The first stop lever assembly 16 cannot stop the second valve rod 31 and only can stop the first valve rod 30 when moving upwards. The first valve rod 30 drives the channel of the ball body of the ball valve 33 to be opened as being stopped by the first stop lever assembly 16, and the ball valve 33 is opened.

The length of the stop lever 23 of the second stop lever assembly 17 is smaller than the length of the stop lever 23 of the first stop lever assembly 16. A distance between the second valve rod 31 and the bottom wall of the outer tub 13 is smaller than a distance between the first valve rod 30 and the bottom wall of the outer tub 13, so that the stop lever 23 of the second stop lever assembly 17 only stops the second valve rod 31 when moving upwards.

In this way, the height of the stop lever 23 of the second stop lever assembly 17 moving upwards only can allow that the stop rod 23 of the second stop rod assembly 17 to stop the second valve rod 31 rather than the first valve rod 30. The second valve rod 31 drives the channel of the ball body of the ball valve 33 to be closed as being stopped by the stop lever 23 of the second stop lever assembly 17, and the ball valve 33 is closed.

In the present invention, the lengths of the first valve rod 30 and the second valve rod 31 meet: the first valve rod 30 rotates for 90 degrees in the reverse direction as being stopped by the first stop lever assembly 16 and then is separated from the first stop lever assembly 16, and the second valve rod 31 rotates for 90 degrees in the forward direction as being stopped by the second stop lever assembly 17 and then is separated from the second stop lever assembly 17.

In this way, the ball valve 33 can be opened and closed only after the first valve rod 30 and the second valve rod 31 rotate to right positions. Besides, when the ball valve 33 is opened and closed, the first valve rod 30 and the second valve rod 31 cannot rotate anymore after rotating to the right positions, and the first stop lever assembly 16 and the second stop lever assembly 17 must be separated from the first valve rod 30 and the second valve rod 31 so as to not influence operation of the inner tub 1.

Therefore, free ends of the first valve rod 30 and the second valve rod 31 cannot extend out of the edge of the inner tub 1.

Figure 6:
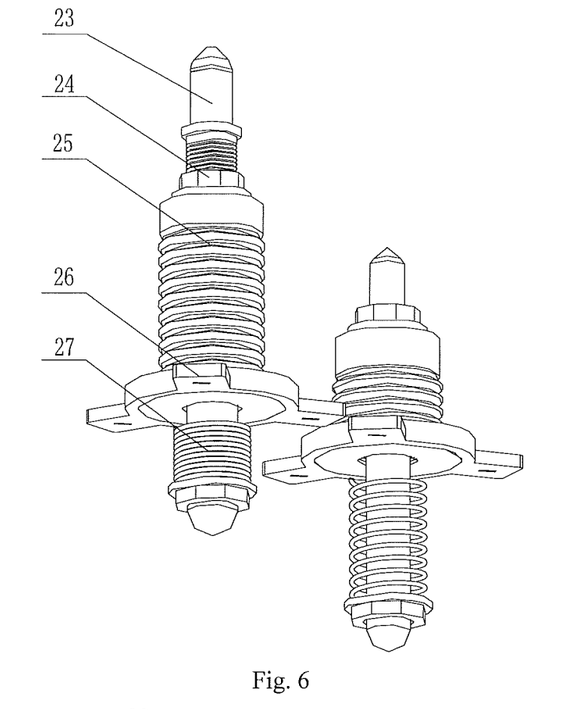
FIG. 6 is a stereoscopic view of a first stop lever assembly and a second stop lever assembly of the present invention.
Figure 7:
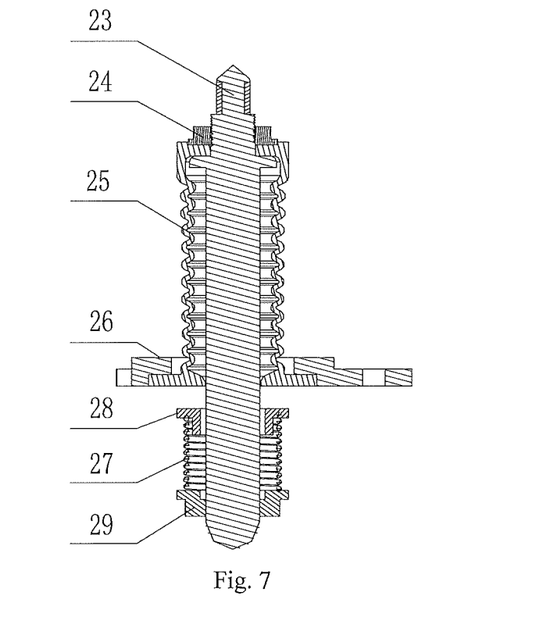
FIG. 7 is a cutaway view of a first stop lever assembly or a second stop lever assembly of the present invention.

As shown in FIG. 6 and FIG. 7, in the present invention, each of the first stop lever assembly 16 and the second stop lever assembly 17 comprises the stop lever 23, a nut 24, a sealing sleeve 25, a fixing disk 26 and a compression spring 27. The stop levers 23 pass through the bottom wall of the outer tub 13. In the present invention, the stop levers 23 of the first stop lever assembly 16 and the second stop lever assembly 17 can move upwards and downwards in order to stop the first valve rod 30 and the second valve rod 31. The upper part of each stop lever 23 is located between the inner tub 1 and the outer tub 13, and the lower part of each stop lever 23 is located at the exterior of the bottom wall of the outer tub 13. The sealing sleeve 25 is set on the upper part of the corresponding stop lever 23 and can extend and contract along with the movement of the corresponding stop lever 23. One end of each sealing sleeve 25 is fixed on the corresponding stop lever 23 through the nut 24, and the other end of each sealing sleeve 25 is fixed on the bottom wall of the outer tub 13 through the fixing disk in a sealed manner in order to keep sealing between the first stop lever assembly 16 and the second stop lever assembly 17 and the outer tub 13 so as to prevent water leakage.

In the present invention, each compression spring 27 is arranged at the lower part of the corresponding stop lever 23. A stop nut 29 for stopping one end of each compression spring 27 is arranged at the lower end of the corresponding stop lever 23. And each compression spring 27 is arranged between the bottom wall of the outer tub 13 and the corresponding stop nut 29.

Further, a fixed base 28 is mounted on the outer tub 13, the stop levers 23 pass through the fixed base 28, and the compression springs 27 are arranged between the fixed base 28 and the stop nuts 29, thereby preventing the compression springs 27 from pressing the outer tub 13 while being pressed so as to prevent damage to the outer tub 13 caused by frequent press.

In the present invention, the ball valve 33 is mounted between the inner tub 1 and the outer tub 13. In order to provide enough space for mounting the ball valve 33, a groove structure 15 is formed in the bottom wall of the outer tub 13. The first stop lever assembly 16 and the second stop lever assembly 17 are mounted in the groove structure 15, and the groove structure 15 is provided with an outer tub drainage outlet 14.

Figure 3:
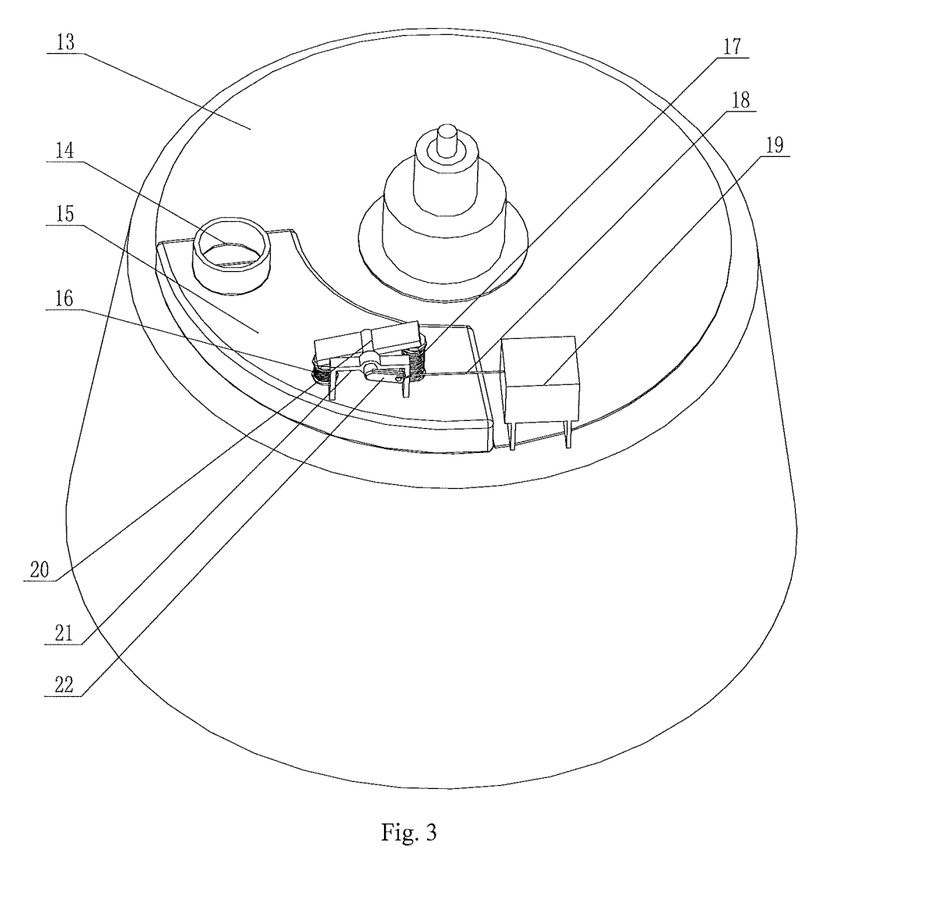
FIG. 3 is a stereoscopic view of a drainage structure mounted at the bottom of an outer tub of the present invention.
Figure 4:
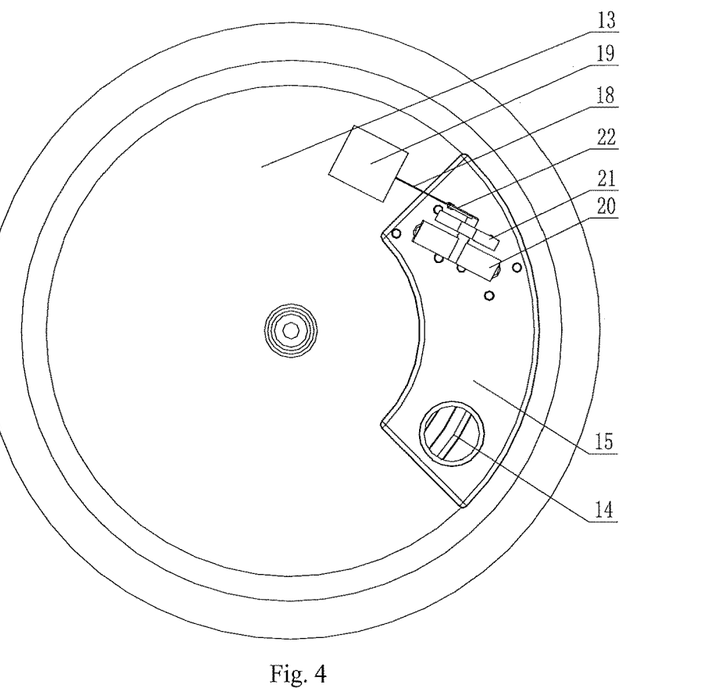
FIG. 4 is a top view of FIG. 3 of the present invention.
Figure 5:
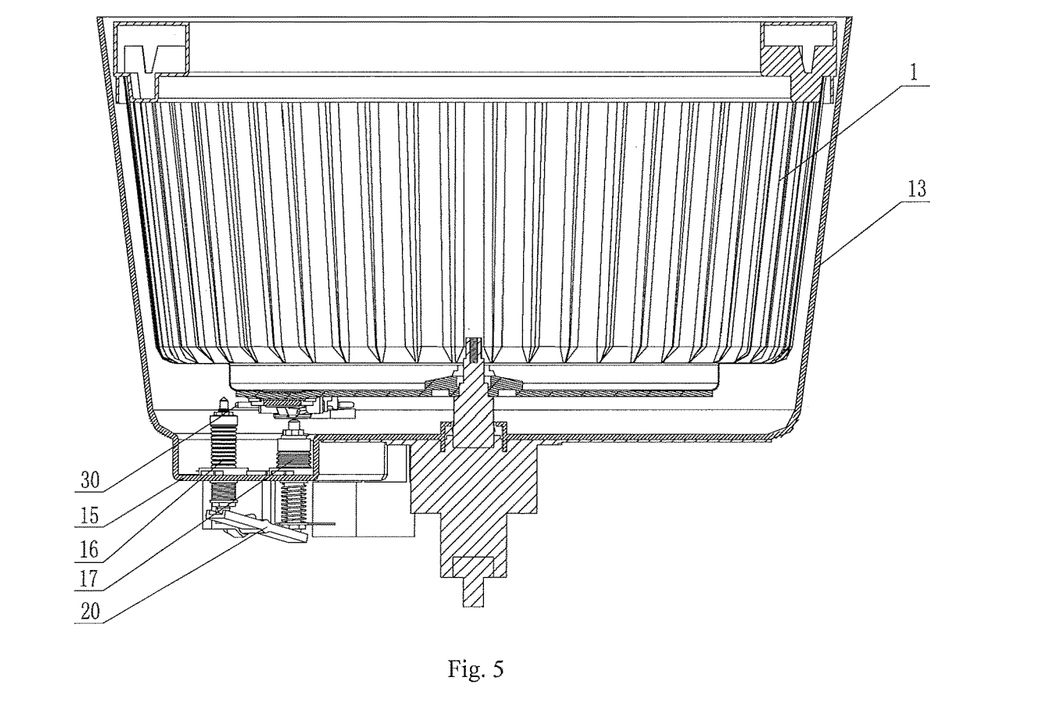
FIG. 5 is a cutaway view of FIG. 3 of the present invention.

In the present invention, in order to implement the upwards and downwards movement of the first stop lever assembly 16 and the second stop lever assembly 17, as a preferred embodiment of the present invention, as shown in FIG. 3, FIG. 4 and FIG. 5, the driving device further comprises a press plate 20, a support 21, a pull rod 22 and a traction motor 19. The support 21 is fixed on the outer side of the bottom wall of the outer tub 13, the pull rod 22 is rotatably mounted on the support 21, one end of the pull rod 22 is connected with the traction motor 19, the other end of the pull rod 22 is fixedly connected with the press plate 20, and two ends of the press plate 20 press on the first stop lever assembly 16 and the second stop lever assembly 17, respectively; the pull rod 22 and the press plate 20 rotate around the support 21 under the traction of the traction motor 19. When one end of the press plate 20 moves upwards, the press plate presses the first stop lever assembly 16 to move upwards, the other end of the press plate 20 moves downwards and then the second stop lever assembly 17 moves downwards.

As a preferred embodiment of the present invention, the traction motor 19 is connected with the pull rod 22 through a pull rope 18.

What described above are only preferred embodiments of the present invention, but are not intended to limiting the scope of the present invention in any forms. Although the present invention has been disclosed in terms of preferred embodiment, it is not limited thereto. Without departing from the scope of the technical solution of the present invention, any persons skilled in the present invention can make equivalent embodiments with various alterations and modifications as equivalent variations by utilizing the above-mentioned technical contents. However, without departing from the contents of the technical solution of the present invention, any simple changes, equivalent variations and modifications made according to the technical essence of the present invention shall all be covered within the scope of the technical solution of the present invention.

The invention claimed is:

1. A drainage structure for a washing machine which comprises an outer tub and an inner tub without holes in a lower part of a tub side wall, comprising a ball valve and a driving device,
a water inlet end of the ball valve being communicated with a drainage outlet at a bottom wall of the inner tub,
wherein,
the ball valve comprises a valve casing, a ball body, a first valve rod and a second valve rod, the ball body is rotatably arranged in the valve casing, the first valve rod and the second valve rod are connected respectively with the ball body of the ball valve;
the driving device comprises a first stop lever assembly, and a second stop lever assembly;
the first stop lever assembly and the second stop lever assembly are mounted on a bottom wall of the outer tub; and
the first valve rod is configured to be stopped by the first stop lever assembly and is configured to rotate for 90 degrees in a reverse direction so as to open the ball valve when the inner tub rotates in a forward direction, and the second valve rod is configured to be stopped by the second stop lever assembly and is configured to rotate for 90 degrees in the forward direction so as to close the ball valve when the inner tub rotates in the reverse direction.

2. The drainage structure according to claim 1, wherein, a length of the first valve rod is larger than a length of the second valve rod.

3. The drainage structure according to claim 2, wherein, each of the first stop lever assembly and the second stop lever assembly respectively comprises a stop lever configured to move upwards and downwards,
the first stop lever assembly is arranged radially further from a center of the outer tub than the second stop lever assembly, so that the stop lever of the first stop lever assembly only stops the first valve rod when moved upwards.

4. The drainage structure according to claim 2, wherein, each of the first stop lever assembly and the second stop lever assembly respectively comprises a stop lever configured to move upwards and downwards,
a length of the stop lever of the second stop lever assembly is smaller than a length of the stop lever of the first stop lever assembly, and a distance between the second valve rod and the bottom wall of the outer tub is smaller than a distance between the first valve rod and the bottom wall of the outer tub, so that the stop lever of the second stop lever assembly only stops the second valve rod when moved upwards.

5. The drainage structure according to claim 1, wherein, each of the first stop lever assembly and the second stop lever assembly respectively comprises a stop lever configured to move upwards and downwards,
the first stop lever assembly is arranged radially further from a center of the outer tub than the second stop lever assembly, and a length of the first valve rod is larger than a length of the second valve rod, so that the stop lever of the first stop lever assembly only stops the first valve rod when moved upwards; and
a length of the stop lever of the second stop lever assembly is smaller than a length of the stop lever of the first stop lever assembly, and a distance between the second valve rod and the bottom wall of the outer tub is smaller than a distance between the first valve rod and the bottom wall of the outer tub, so that the stop lever of the second stop lever assembly only stops the second valve rod when moved upwards.

6. The drainage structure according to claim 1, wherein, each of the first stop lever assembly and the second stop lever assembly comprises a stop lever, a nut, a sealing sleeve, a fixing disk and a compression spring, the stop levers pass through the bottom wall of the outer tub, an upper part of each stop lever is located between the inner tub and the outer tub, a lower part of each stop lever is located at an exterior of the bottom wall of the outer tub, each sealing sleeve is set on the upper part of each of the stop levers and extends and contracts along with the movement of each of the stop levers, a first end of each sealing sleeve is fixed on each of the stop levers through each of the nuts, and a second end of each sealing sleeve is fixed on the bottom wall of the outer tub through each of the fixing disks in a sealed manner; and each compression spring is set around a lower part of each of the stop levers.

7. The drainage structure according to claim 6, wherein, a stop nut for stopping one end of each compression spring is arranged at a lower end of each of the stop levers, and each compression spring is arranged between the bottom wall of the outer tub and each of the stop nuts.

8. The drainage structure according to claim 1, wherein, the bottom wall of the outer tub is provided with a groove structure, the first stop lever assembly and the second stop lever assembly are mounted in the groove structure, and the groove structure is provided with an outer tub drainage outlet.

9. The drainage structure according to claim 1, wherein, the driving device further comprises a press plate, a support, a pull rod and a traction motor, the support is fixed on an outer side of the bottom wall of the outer tub, the pull rod is rotatably mounted on the support, a first end of the pull rod is connected with the traction motor, a second end of the pull rod is fixedly connected with the press plate, and two ends of the press plate press on the first stop lever assembly and the second stop lever assembly respectively; and the pull rod and the press plate rotate around the support under the traction of the traction motor, when a first end of the press plate moves upwards, the press plate presses the first stop lever assembly to move upwards, and a second end of the press plate moves downwards and then the second stop lever assembly moves downwards.

* * * * *